US009258982B1

(12) United States Patent  
Golden

(10) Patent No.: US 9,258,982 B1
(45) Date of Patent: Feb. 16, 2016

(54) DOG COLLAR WITH GEO-POSITIONING TRACKING AND CONTROL CUE CAPABILITY

(75) Inventor: John Michael Golden, Pell City, AL (US)

(73) Assignee: WOLFGIS, LLC, Pell City, AL (US)

( * ) Notice: Subject to any disclaimer, the term of this patent is extended or adjusted under 35 U.S.C. 154(b) by 0 days.

(21) Appl. No.: 13/525,295

(22) Filed: Jun. 16, 2012

Related U.S. Application Data

(60) Provisional application No. 61/497,842, filed on Jun. 16, 2011, provisional application No. 61/551,842, filed on Oct. 26, 2011.

(51) Int. Cl.
*A01K 15/02* (2006.01)

(52) U.S. Cl.
CPC .................................. *A01K 15/021* (2013.01)

(58) Field of Classification Search
CPC ....................................................... A01K 15/021
USPC ................................................. 119/718–721
See application file for complete search history.

(56) References Cited

U.S. PATENT DOCUMENTS

| 5,375,059 | A | 12/1994 | Kyrtsos et al. |
| 5,438,517 | A | 8/1995 | Sennott et al. |
| 5,490,073 | A | 2/1996 | Kyrtsos et al. |
| 5,791,294 | A | 8/1998 | Manning |
| 5,868,100 | A | 2/1999 | Marsh |
| 6,043,748 | A | 3/2000 | Touchton |
| 6,232,880 | B1 | 5/2001 | Anderson |
| 6,232,916 | B1 | 5/2001 | Grillo |
| 6,271,757 | B1 | 8/2001 | Touchton |
| 6,487,992 | B1 | 12/2002 | Hollis |
| 6,581,546 | B1 | 6/2003 | Dalland |
| 6,700,492 | B2 | 3/2004 | Touchton |
| 6,903,682 | B1 | 6/2005 | Maddox |
| 8,378,815 | B1 | 2/2013 | McNulty et al. |
| 8,934,923 | B1 | 1/2015 | Golden |
| 2005/0205719 | A1 | 9/2005 | Hendrickson et al. |
| 2006/0011145 | A1* | 1/2006 | Kates ............................ 119/719 |
| 2006/0027185 | A1 | 2/2006 | Troxler |
| 2006/0135180 | A1 | 6/2006 | Jakel et al. |
| 2008/0236514 | A1* | 10/2008 | Johnson et al. ............... 119/719 |
| 2010/0139576 | A1 | 6/2010 | Kim et al. |
| 2010/0234718 | A1* | 9/2010 | Sampath et al. ............... 600/407 |
| 2012/0006282 | A1* | 1/2012 | Kates ............................ 119/720 |
| 2012/0017846 | A1* | 1/2012 | Duncan et al. ................ 119/720 |
| 2012/0037088 | A1* | 2/2012 | Altenhofen ................... 119/720 |
| 2012/0272924 | A1* | 11/2012 | So ................................. 119/720 |
| 2013/0092099 | A1* | 4/2013 | Hardi et al. ................... 119/721 |
| 2013/0098311 | A1* | 4/2013 | Gurley et al. ................. 119/721 |
| 2013/0118418 | A1* | 5/2013 | Lalor ............................ 119/720 |
| 2013/0127658 | A1 | 5/2013 | McFarland |

(Continued)

FOREIGN PATENT DOCUMENTS

EP 1431848 A2 6/2004

*Primary Examiner* — Brian M O'Hara
*Assistant Examiner* — Morgan T Barlow
(74) *Attorney, Agent, or Firm* — Butler Snow LLP

(57) ABSTRACT

A dog collar for the remote control and confinement of a dog or other suitable animal to selected geographical boundary. The system uses a series of audible cues or electrical shocks to motivate the dog to move away from an approaching preselected boundary while continually monitoring the current GPS location of the dog and recording those positions. A user interface allows for a user to program a boundary into the dog collar.

22 Claims, 5 Drawing Sheets

(56) References Cited

U.S. PATENT DOCUMENTS

| | | |
|---|---|---|
| 2013/0174076 A1 | 7/2013 | Geelen |
| 2013/0192526 A1* | 8/2013 | Mainini .................... 119/51.02 |
| 2013/0206081 A1* | 8/2013 | Barcik et al. .................. 119/719 |
| 2013/0207803 A1* | 8/2013 | Charych .................. 340/539.11 |
| 2013/0233252 A1* | 9/2013 | Bellon et al. .................. 119/720 |

* cited by examiner

DOG COLLAR WITH GEO-POSITIONING TRACKING AND CONTROL CUE CAPABILITY

This application claims the benefit of filing priority under 35 U.S.C. §119 and 37 C.F.R. §1.78 of the U.S. Provisional Application Ser. No. 61/497,842 filed Jun. 16, 2011, for a Software Algorithm For Mobile Devices Using Position Sensor To Lock User Position Within Boundary Lines, and U.S. Provisional Application Ser. No. 61/551,842 filed Oct. 26, 2011, for a Dog Collar with Aural Cues and Tract-Lock GPS Technology. All information disclosed in those prior provisional applications is incorporated herein by reference.

FIELD OF THE INVENTION

The present invention relates generally to devices using GPS based software and hardware to determine an Earth based location. In greater particularity, the present invention relates to GPS devices and the recordation of their geo-location. In even greater particularity, the present invention relates to animal control collars for the control and confinement of an animal to predefined boundary area.

BACKGROUND OF THE INVENTION

The use of global positioning systems (GPS) to determine the terrestrial position of a portable device is well-known in the art. For instance, U.S. Pat. No. 5,375,059 to Kyrtsos et al., U.S. Pat. No. 5,438,517 to Sennott et al., and U.S. Pat. No. 5,490,073 to Kyrtsos each describe a navigational system for vehicles utilizing the electromagnetic signals received from GPS satellites. The aforementioned patents (U.S. Pat. No. 5,375,059; U.S. Pat. No. 5,438,517; U.S. Pat. No. 5,490,073) are hereby incorporated by reference in their entireties.

A global positioning system works by utilizing a network of GPS satellites that continuously transmit signals to the Earth; the data transmitted by these signals includes the precise time at which the signal was transmitted by the satellite. By noting the time at which the signal is received at a GPS receiver, a propagation time delay can be calculated. By multiplying the propagation time delay by the signal's speed of propagation, the GPS receiver can calculate the distance between the satellite and the receiver. This calculated distance is called a "pseudorange," due to error introduced by the lack of synchronization between the receiver clock and GPS time, as well as atmospheric effects. Using signals from at least three satellites, at least three pseudoranges are calculated, and the position of the GPS receiver is determined through a geometrical triangulation calculation.

When GPS signals are not available, the position of a portable device may also be calculated through other means, such as a dead-reckoning system incorporating an accelerometer. For instance, U.S. Pat. No. 5,606,506 to Kyrtsos and U.S. Pat. No. 6,308,134 to Croyle et al. each describe navigational systems integrating both GPS and dead-reckoning techniques. U.S. Patent Publication No. 2007/0260398 to Stelpstra further describes a device that calculates calibration parameters for its accelerometer while GPS data is available, enabling the device to determine its position exclusively using data derived from the accelerometer when GPS data is unavailable. The aforementioned patents and patent publications (U.S. Pat. No. 5,606,506; U.S. Pat. No. 6,308,134; U.S. Patent Publication No. 2007/0260398) are hereby incorporated by reference in their entireties.

Certain currently available GPS systems also utilize remote databases to store GPS related information, which is then communicated to a portable device. U.S. Pat. No. 6,222,483 to Twitchell et al., for example, discloses a GPS location system for mobile phones in which the GPS satellite information is stored in a database on a server accessed via an Internet interface. The aforementioned patent (U.S. Pat. No. 6,222,483) is hereby incorporated by reference in its entirety.

Animal training systems that utilize geo-positioning techniques to control movement of an animal via electrical and audible cues are also known in the art. For example, U.S. Pat. Nos. 7,034,695 and 7,786,876 to Troxler and U.S. Pat. No. 5,857,433 to Files each disclose a device for controlling an animal's movement using a collar to provide a physical stimulus and/or audible cue. The aforementioned patents (U.S. Pat. No. 5,857,433; U.S. Pat. No. 7,034,695; U.S. Pat. No. 7,786,876) are hereby incorporated by reference in their entireties.

However, while some geo-positioning animal collars exits, none offer the convenience and remote control offered by interfacing with a remote database, especially where a user can upload various geo-positional parameters, verbal cues and vocal commands, and also be able to track in real-time an animal's location. Hence, what is needed is a system to allow for remote programing of an animal collar and the retention of that programming so that re-programing of the animal collar is convenient and consistent in its operation.

SUMMARY OF THE INVENTION

In summary, the invention is a dog collar system and method for the remote control and confinement of a dog or other suitable animal to selected geographical boundary. The system uses a series of audible cues or electrical shocks to motivate the dog to move away from an approaching preselected boundary while continually monitoring the current GPS location of the dog and recording those positions. Other features and objects and advantages of the present invention will become apparent from a reading of the following description as well as a study of the appended drawings.

BRIEF DESCRIPTION OF THE DRAWINGS

A dog collar with geo-positioning tracking and control cue capability incorporating the features of the invention is depicted in the attached drawings which form a portion of the disclosure and wherein.

DESCRIPTION OF THE PREFERRED EMBODIMENTS

Figure 1:
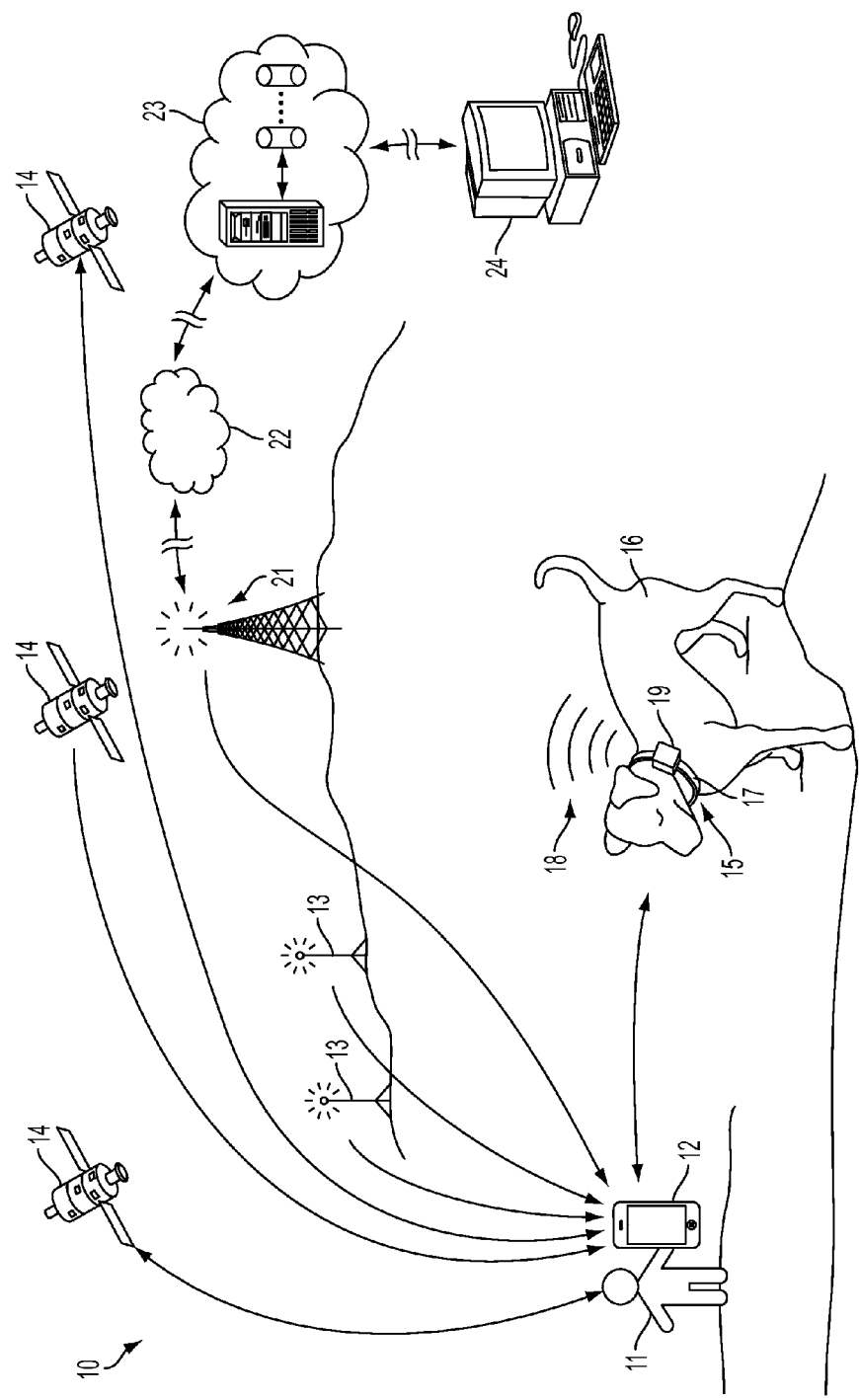
FIG. 1 is a general communication system infrastructure diagram showing a dog wearing the invention and connected to various communication elements in which the collar operates.

Referring to the drawings for a better understanding of the function and structure of the invention, FIG. 1 shows a schematic view of the communications infrastructure 10 utilized by the present invention during typical use in a hunting scenario. In this sample scenario, an individual 11 desires to track the position of his dog 16 within a particular tract of land as the dog follows a scent. The user initiates a software application on mobile device 12, which includes receivers capable of detecting signals originating from GPS satellites 14, WiFi repeater/booster stations 13, and one or more cell towers 21, as well as signal 18 originating from the electronics module 19 located on the dog's collar 15.

By connecting with the Internet 22 via WiFi, Bluetooth, or cell transmissions, the software application can access both land tract data and the dog's geo-positional data stored in a SQL relational database on a remote server, such as cloud server 23. The data contained on cloud server 23 can also be accessed and modified by remote computing device 24, such as a PC, via an Internet connection.

Figure 2A:
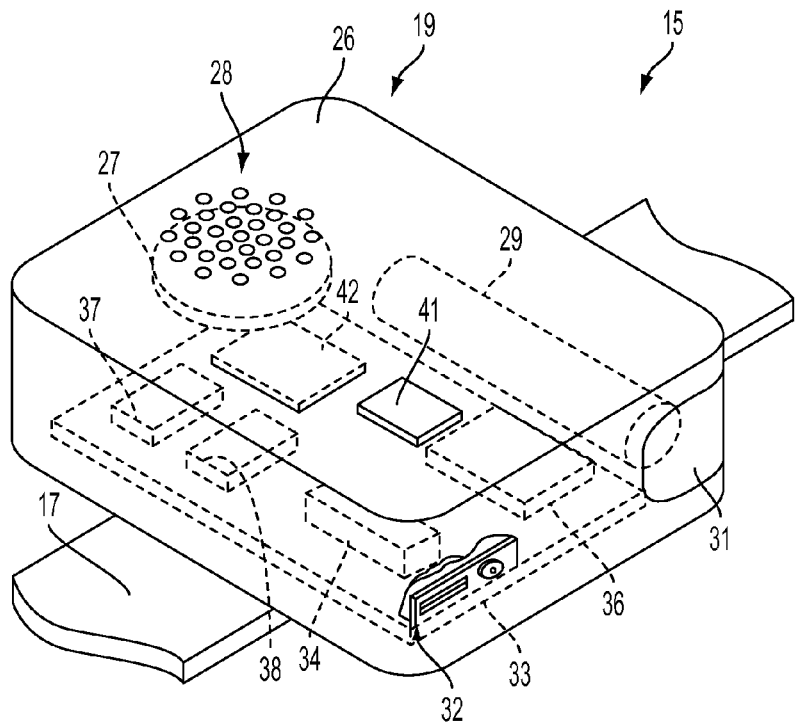
FIG. 2A is a three dimensional view of the invention showing its internal electronics.

FIG. 2A depicts a three-dimensional view of the dog's collar 15. The dog's collar 15 consists of two major components: an electronics module 19 and a self-adjusting strap 17. The electronic components are housed in a generally waterproof case 26. The electronics module 19 is powered by battery 29, which is accessible via battery compartment access panel 31. Electronics module 19 receives power and data via connection ports 32, which include a USB connector and a power connector. Dual-sided motherboard 33 serves as the infrastructure for the electronic components contained in the module, including input/output electronics 34, WiFi chip 36, sound synthesizer 37, GPS chip 38, cellular transceiver 41, and microprocessor 42. Electronics module 19 also contains acoustic device 27, which is located directly beneath case perforations 28 in order to produce optimal sound quality. Additional embodiments of invention include electronic components used for monitoring and recording physiological data, such as the dog's pulse rate or body temperature.

Figure 2B:
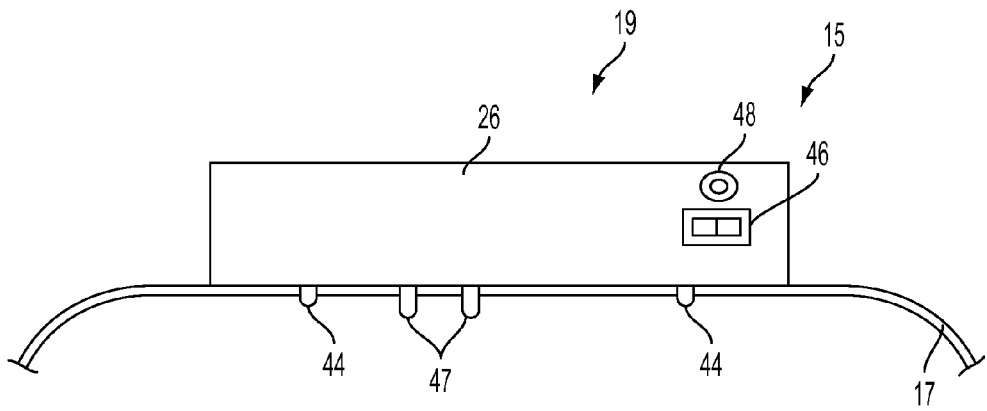
FIG. 2B is a side view of the invention showing its shocking prongs and an external switch.

FIG. 2B depicts a side view of the dog's collar 15. The on/off switch 46 is located on the side of the electronics module 19, directly adjacent to an LED 48 that indicates whether the collar's electronic components are on or off. Self-adjusting collar strap 17 attaches to the electronics module 19 via strap retainers 44. Shocking prongs 47 protrude through holes in strap 17 in order to maintain contact with the dog's body.

Figure 3:
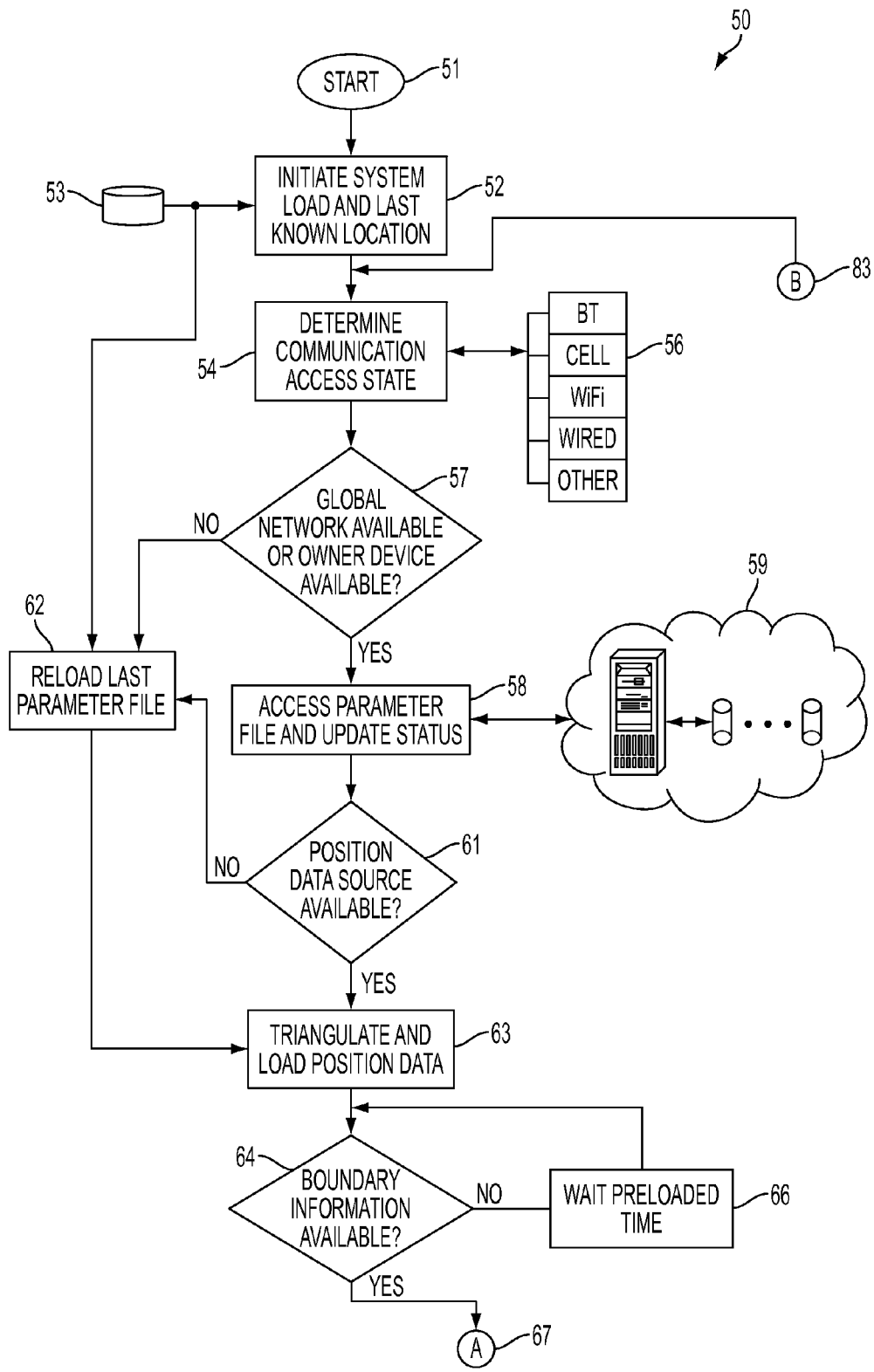
FIG. 3 is a process flow diagram showing part of the processing of the invention.

FIG. 3 illustrates the process by which the software algorithm of the present invention determines a dog's terrestrial position. As discussed previously, a user who wishes to determine his or her dog's position will initiate the software application on mobile device 12. The user will also ensure that the dog collar 15 is switched on, thereby initiating the software in collar 15 as well. Upon initiation 52, the dog collar 15 will retrieve and load last-known position data from the local storage 53 in the dog collar 15. After loading the last-known position data, the software algorithm determines 54 the most appropriate communication access state, choosing among the available communication paths 56, which, depending on signal strength and availability, could include communication via Bluetooth, cell, WiFi, wired, or other such methods. The software algorithm ranks the various communication paths 56 in real time, basing its ranking on signal strength, transmission speed, and other such factors that affect the efficiency of data transmission. Once the optimal communication path 56 is chosen, the software algorithm determines 57 whether the chosen communication path 56 will allow it to access the Internet or a device associated with the dog's owner, such as mobile device 12 or PC 24. If the software is unable to access the Internet or a device with the chosen communication path 56 (e.g., if the signal were too weak to provide an adequate connection), FIG. 3 illustrates a method by which the software uses the last-known position data previously retrieved from local storage 53 to calculate 63 the dog's current position, a process which is detailed below. In other embodiments of the invention, however, position data produced by dead-reckoning techniques, such as an accelerometer-based method, may be used in place of the last-known position data.

If the chosen communication path 56 will allow the software to access the Internet or a device, it will access 58 the owner's account on cloud server 59 or local storage on the owner's device. The software will communicate with the server or device to record data indicating the dog's current geo-positional location and/or update the status of the dog's position with respect to a boundary. The software will also access any designated boundary data, if available.

Once the software application has communicated with cloud server 59 or a device, the software determines 61 whether a position data source is available. Again, FIG. 3 illustrates a process in which GPS positioning is the method used to calculate the dog's current location, but other embodiments of the present invention would utilize various methods of location determination, including a system integrating GPS positioning with accelerometer-based dead-reckoning.

In order to determine whether a position data source is available, the software communicates with a GPS receiver located in electronics module 19. If at least three GPS signals are available, the software uses the time stamp obtained from each signal to calculate a pseudorange for each satellite. Once the pseudoranges have been calculated, the algorithm geometrically triangulates 63 the terrestrial position of collar 15 and records the resulting position data as the dog's current location.

In the preferred embodiment of the invention, accuracy of geo-position data is increased by utilizing multiple position calculations, including triangulation based on signals from GPS satellites, cell towers, and WiFi transceivers, as well as data obtained from an accelerometer-based dead-reckoning system. Additionally, a differential "receiver autonomous integrity monitoring" ("RAIM") method may be applied to data received from the GPS, cell tower, or WiFi transceiver signals. The RAIM method utilizes data obtained from redundant sources (i.e., signal sources above the minimum number required for triangulation) to estimate the statistical probability of inaccuracy in a device's calculated geo-position. Further, the preferred embodiment of the invention utilizes a NIST-calibrated time stamp to calculate and compensate for geo-positioning error resulting from inaccuracies in the time stamps contained in GPS, WiFi, and cell signals used for triangulation, as well as inaccuracies in the internal clock of components of electronics module 19. The preferred embodiment of the invention utilizes NIST-calibrated time data obtained from a remote server. One example of a provider of time data with a NIST Certificate of Calibration is Certichron, Inc. A further embodiment of the invention would utilize a nearby base station with a known location. Geo-positioning data for the local base station would be obtained via GPS, WiFi, and cell signal triangulation methods and utilized to further calculate and compensate for inaccuracies associated with the geo-position data obtained by electronics module 19. Through one or a collection of the above strategies, accurate geographical location to within a few inches for a device may be routinely obtained.

Once the software has obtained position data via any of the above-discussed methods, the software will then determine 64 whether data associated with a designated boundary is available. If not, the software will wait a preloaded time 66 and then proceed again to determine 64 whether boundary data has become available. The algorithm will continue this process until the software is able to access boundary information for the to session.

Figure 4:
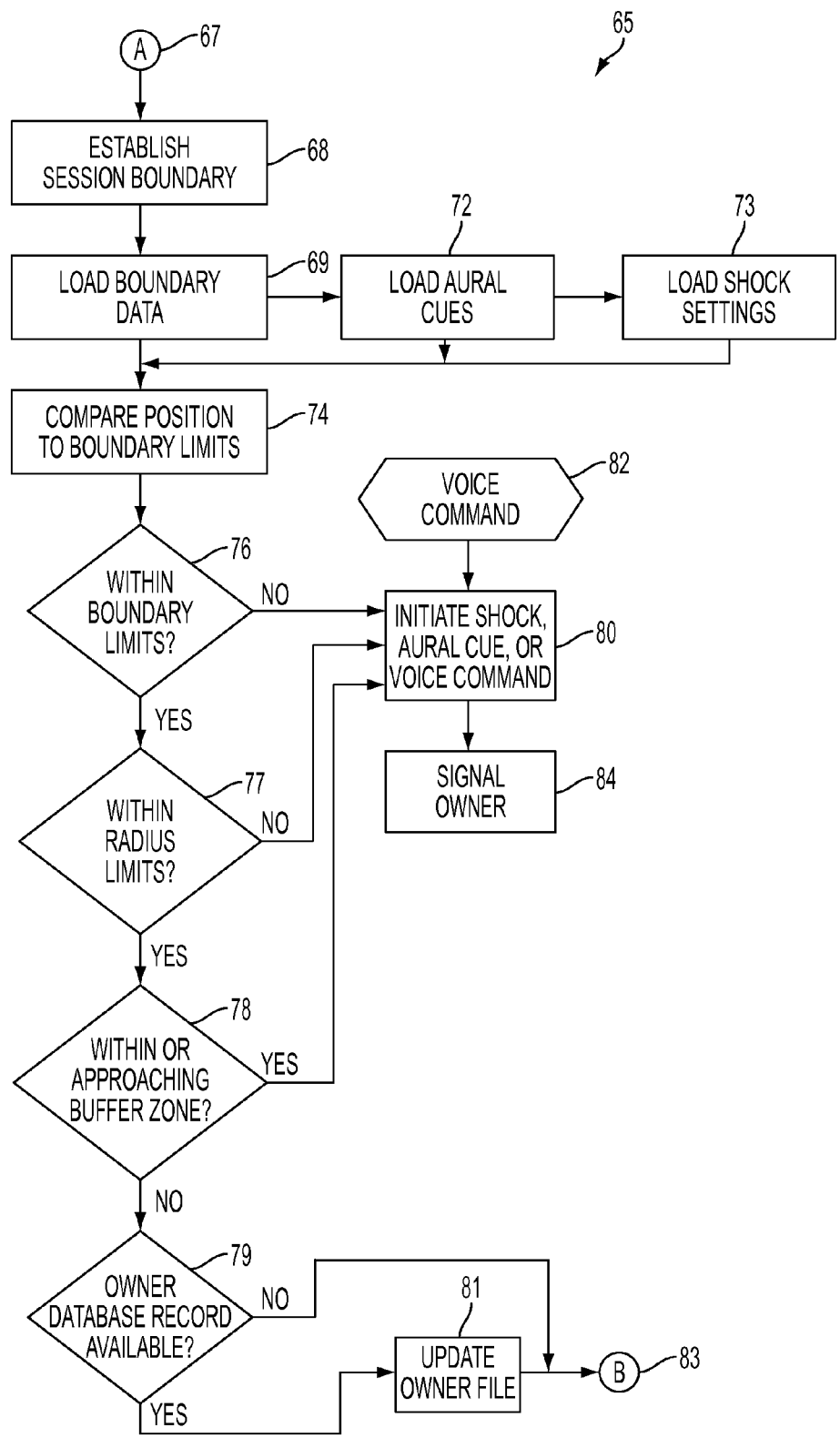
FIG. 4 is a process flow diagram showing another portion of the processing of invention with stimulus control of the dog; and, FIG. 5 is a diagram to show how the steps of FIGS. 3 and 4 are implemented in a real world scenario.
Figure 5:
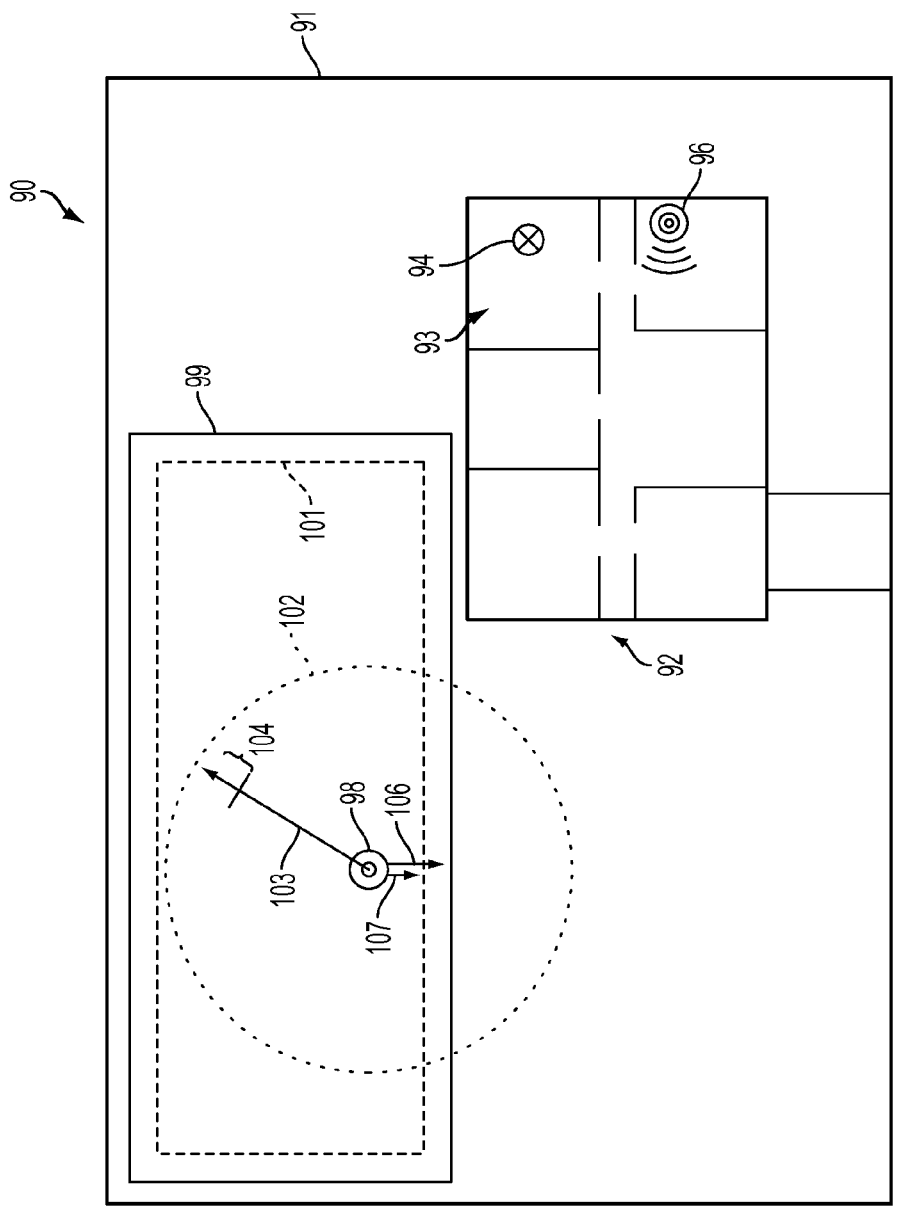

Referring now to FIG. 4, the software proceeds to establish 68 a geographic boundary for the session. In one method, a data file with coordinates for a pre-specified boundary could be downloaded to the collar. In another embodiment, the user could specify that the boundary relating to a particular tract of land (e.g., a property line) be established as the boundary for the session. In an additional embodiment, a boundary data set could be created by the user by pinpointing vertices of a polygon on a map of a tract of land on a remote computing device and uploading the data set directly to the collar or via database 59. In another method, a user could pinpoint a single point and define the boundary as a circle of a specified radius with its center at the pinpointed location. In an additional embodiment, a user could travel the desired boundary line holding either mobile device 12 or collar 15, thereby creating a boundary data set consisting of the coordinates of selected points on the desired boundary line. FIG. 5 shows an example 90 of a dog located within a boundary established by one or more of the above-mentioned methods.

In a preferred embodiment of the invention, a user could "draw" the boundary directly onto a map of a tract of land in a software application coupled electronically with device 12 or database 23. In this embodiment, mobile device 12 would include a touch-sensitive screen apparatus; when the user touches a point on the map of the tract shown on the device's screen, the application would record that point's geo-position coordinates. As the user touches successive points on the screen, the application would record a series of coordinates. Once the user defined the desired boundary on the map of the tract, the data set consisting of the series of coordinates would be used to establish that session's boundary. Further, in the preferred embodiment of the invention, each boundary defined by a user is stored in a SQL relational database, allowing the user to utilize the same boundary data set in later sessions.

Referring again to FIG. 4 and FIG. 5, a geographic boundary 99 is established 68 for the session, the software loads 69 the boundary data and, potentially, displays boundary 99 on the user's PC or mobile device, such as a tablet computer. Along with the boundary data, the software also loads aural cues 72 and shock settings 73 that have been stored either locally, on a connected device, or on cloud server 59. The algorithm then compares 74 the dog's current position with the boundary 99 previously established for the session. If the software determines 76 that the dog's current position is not within the specified boundary limits, the software will initiate 80 a shock, aural cue, and/or voice command, which the dog's owner would have previously recorded to a data file and stored 82 in the database on cloud server 59. In lieu of an administered shock, the collar might also be equipped with a canine offensive mist that may be dispensed upon command. In addition to these immediate corrective actions, the software would also signal 84 the dog's owner to notify him of the dog's current position with respect to the boundary 99.

In an embodiment of the invention in which the owner chooses to create a boundary by pinpointing the center of a circle with a specified radius, after the software algorithm compares 74 the dog's current position with the boundary 102 established for the session. If the software determines 77 that the dog's current position is not within the specified radius limits established as the boundary for the session, the software will initiate 80 a shock, aural cue, and/or voice command and signal 84 the owner to notify him of the dog's current position with respect to the boundary.

If the software determines that the dog's current position is within the specified boundary for the session, the algorithm then determines 78 the dog's position with respect to a buffer zone. Generally, the buffer zone will be defined by the owner as a set distance from any point on the boundary line (e.g., the user would like to receive a warning if the dog travels within 2 feet of any point on the boundary line). In another embodiment of the invention, the owner could define a more specialized buffer zone (e.g., the owner would like to receive a warning if the dog travels within 10 feet of a boundary line adjacent to a particular tract of land, but would only like to receive a warning if the dog travels within 2 feet of a boundary line adjacent to a separate tract of land). In either case, the buffer zone may be defined either by the owner in the software application, or by a remote user connected to a remote computing device with access to the server storing the SQL relational database. In one of the sample scenarios depicted in FIG. 5, the user has chosen to define the buffer zone as a specified distance 104 from boundary line 102.

If the application determines 78 that the dog's current position 98 is within the defined buffer zone, the software will initiate 80 an aural cue and/or voice command and signal 84 the owner.

Even if the dog's current location is not within the buffer zone, the application also uses predictive modeling to determine whether the dog is approaching the buffer zone, based on the velocity vectors obtained from GPS/WiFi/cell tower triangulation data or data obtained from the collar's accelerometer or other dead-reckoning system. If the velocity vector data indicates that the dog will enter the buffer zone within a time period that has been pre-specified by the owner or a remote administrator (e.g., if the dog will enter the buffer zone within 5 seconds), the application will initiate 80 an aural cue and/or voice command and signal 84 the owner.

After performing the steps discussed above, the application then determines 79 whether the owner's database record is available. If so, the application updates the position data contained in either local storage on mobile device 12 or PC 24, or the SQL relational database stored on cloud server 23, updating 81 the owner's data file by recording the dog's current location with respect to time, as well as a velocity vector to indicate the dog's heading.

FIG. 5 may be used to illustrate the processes discussed above with respect to a pet-confinement scenario 90. A dog's owner 94 desires to confine his pet to a portion of the owner's property having property boundary 91. The owner 94 would initiate the software application using either mobile device 12 or PC 24. Each of these devices would have access to the SQL database stored on cloud server 23 via a WiFi router source 96 located in the owner's house 92, but it is recognized that either device could access the Internet via a Bluetooth, cell, wired, or other such method. The owner 94 would then have access to any shape files stored on the database, including, for example, a shape file containing boundary data for the owner's property line 91.

The owner's device would also receive signal 18 transmitting geo-positional data from dog collar 15. Upon initiation of the software application, a satellite view of the land surrounding the dog's location is displayed on a screen, and the dog's current position will be displayed as a point on the map. Drawing coordinate data from the shape file accessed previously, the screen display will also include a representation of property boundary 91 overlaid onto a satellite map image.

The owner 94 would then proceed to create a boundary 99 for the dog. In a preferred embodiment of the invention, the owner 94 would simply "draw" the boundary directly onto the map of the property in the software application. As the owner 94 selects successive points on the screen, the application would record a series of coordinates. Once the owner 94 defined the desired boundary 99 on the map of the property, the data set consisting of the series of coordinates would be used to establish that session's boundary 99. Alternatively, the owner 94 could simply walk the desired boundary line 99 while holding the collar, allowing the application to record the series of geo-position coordinates in a similar fashion.

In this sample scenario, the owner 94 has defined session boundary 99 and buffer zone 101, consisting of a set of points a particular distance (e.g., 2 feet) away from any point on boundary line 99. In an alternative embodiment of the invention, owner 94 could pinpoint a single location 98 and define the boundary 102 as a circle of a specified radius 103 with its center at the pinpointed location 98. The owner 94 could also define a buffer zone for boundary 102 as a circle of specified radius 103 minus distance 104, with its center at the pinpointed location 98.

As the dog moves around the yard, the application screen on the owner's device would track the dog moving within the parcel in real-time. Additionally, if another individual desired to track the dog's movement within the parcel, a remote computing device could retrieve the user's movement data from the database stored on cloud server 23. Generally, as long as the dog remains within the area defined by boundary 99, the owner's application screen would indicate, via both a color-coded display and an "in bounds" message, that the dog's current position is within the boundary.

As for example when dog 16 reaches point 98, various types of data are calculated and potentially displayed on the application screen shown on the owner's device. The software algorithm calculates and displays the distance 106 from the dog's current position 98 to the nearest point on boundary 99, as well as the distance 107 from the dog's current position 98 to the nearest point within the buffer zone. The software algorithm also calculates and displays a velocity vector based on the dog's current bearing. As discussed previously, if the application determined, based on the calculated velocity vector, that the dog would enter the buffer zone within a specified period of time, an "approaching buffer zone" warning would display on the application screen, and an accompanying aural cue and/or voice command would be produced via the acoustic device 27 on the dog collar 15. If the dog entered the buffer zone, the application would alert the owner with a color-coded display and warning message indicating that the dog's current position is within the buffer zone, and an accompanying aural cue and/or voice command would be produced via the acoustic device 27 on the dog collar 15, such as a series of mid-frequency "beeping" sounds, which would escalate in pitch as the dog approaches the boundary 99. If the dog travels outside of the predefined boundary 99, the application would alert the owner with a color-coded display and warning message indicating that the dog's current position is outside the boundary 99, and an accompanying aural cue and/or voice command would be produced via the acoustic device 27 on the dog collar 15, and a shock stimulus could be delivered to the dog via shocking prongs 47.

While I have shown my invention in one form, it will be obvious to those skilled in the art that it is not so limited but is susceptible of various changes and modifications without departing from the spirit thereof.

Having set forth the nature of the invention, what is claimed is:

1. An animal control collar for controlling movements of said animal by an owner, comprising:
    a. an electronic module having a case and including means for communicating wirelessly through an Internet to a remote internet protocol address, means for determining a latitude and longitude for said module on the Earth, a battery, a speaker, a universal serial port external connector, means for communicating over a cellular network, means for communicating with a BLUETOOTH-enabled device proximal to said module, and means for controlling internal electronics of said module in real time and for tracking the animal in real time;
    b. boundary detection means capable of detecting a desired, loaded geo-positional boundary in said module;
    c. means for attaching said control collar to said animal;
    d. means in communication over a global information network with said module for managing a database record holding information associated with a location, a health status based on physiological data, a boundary positioning status, an ownership and geo-positioning boundary files of said module;
    e. means running on said module for calculating whether said animal is geographically positioned within said boundary and taking actions to communicate to said owner said animal's position relative to said boundary; and,
    f. means running on said module for calculating said geo-positional boundary upon the receipt of a land tract file holding geographic information representing the perimeter of a land tract represented by said land tract file, and wherein said geo-positional boundary corresponds to said perimeter of land tract.

2. The control collar as recited in claim 1, wherein said series of aural cues are selected from the group consisting of differentiated tones, human recorded sounds, and human recorded verbal commands.

3. The control collar as recited in claim 2, wherein said geo-positional boundary comprises a circle defined by a selected geo-positional radius.

4. The control collar as recited in claim 3, wherein said series of aural cues comprises a direct data link to a remote device operated by said owner of said animal and said owner initiates real-time voice commands to said speaker.

5. The control collar as recited in claim 4, further including shocking prongs positioned on said module and responsive to said shocking prongs for shocking said animal.

6. The control collar as recited in claim 5, wherein said module includes means for warning said owner upon a transit of said animal beyond said geo-positional boundary.

7. The control collar as recited in claim 1, wherein said geo-positional boundary comprises a circle defined by a selected geo-positional radius.

8. The control collar as recited in claim 7, wherein said geo-positional boundary comprises a geo-positional boundary data set file downloaded from said remote database and wherein said geo-positional boundary data set is associated with a profile record held by said remote database.

9. The control collar as recited in claim 8, wherein said geo-positional radius comprises a data point selected by said owner by selecting a point on a geographical map displayed on a screen of a device operated by said owner and saved to said database record.

10. The control collar as recited in claim 1, wherein said geo-positional boundary comprises said boundary data set file downloaded from said remote database and wherein said geo-positional boundary data set is associated with a profile record held by said remote database.

11. The control collar as recited in claim 10, wherein said owner is in control over said collar from a secondary electronic device in wireless communication with said collar.

12. The control collar as recited in claim 11, wherein said geo-positional boundary data set file comprises said land tract file.

13. The control collar as recited in claim 1, wherein said geo-position boundary comprises said data set produced by said owner by tracing out a geographical boundary map displayed on a screen of said BLUETOOTH-enabled device operated by said owner and in electrical communication with said profile held by said remote database.

14. A method of controlling movements in real time of an animal wearing an electronic collar having an electronics module by an owner comprising the steps of:
  a. said electronic module determining said collar's latitude and longitude on the Earth;
  b. said electronic module communicating with a remote database over a global communications network to obtain geo-positional coordinates for establishing a geo-positional control boundary for said animal;
  c. said electronic module obtaining National Institute of Standards and Technology calibrated time data from a remote server to increase the accuracy of said geo-positional coordinates;
  d. said electronic module continuously monitoring said collar's position with respect to said control boundary and issuing motivating actions to restrict movement of said animal to within said geo-positional control boundary; and
  e. said electronic module including means resident on said server for uploading a land tract file and causing said file to be saved in said remote database, and wherein said geo-positional coordinates obtained by said electronics module to establish said geo-positional control boundary comprise the coordinates held by said land tract file.

15. The method as recited in claim 14, wherein said step of issuing motivating actions comprises issuing at least one aural cue to said animal.

16. The method as recited in claim 15, further including the step of uploading a land tract file and causing said file to be saved in said remote database, and wherein said geo-positional coordinates obtained by said electronic module to establish a control boundary comprise the coordinates held by said land tract file.

17. The method as recited in claim 15, further including the step of said owner tracing out said geo-positional coordinates on a map overlay of said land tract on an electronic device and causing said coordinates to be saved in said remote database, and wherein said geo-positional coordinates obtained by said electronics module to establish said geo-positional control boundary comprise the coordinates traced out by said owner.

18. The method as recited in claim 14, wherein said step of obtaining geo-positional coordinates for establishing said geo-positional control boundary for said animal further comprises the step of establishing a circular geo-positional boundary based on a single geo-positional radius point.

19. The method as recited in claim 18, wherein said step of issuing motivating actions comprises said owner issuing voice commands in real-time to said animal through a speaker in electrical communication with said electronics module.

20. The method as recited in claim 14, further including the step of said owner establishing a direct radio communication with said electronics module for controlling said electronics module.

21. The method as recited in claim 20, wherein said step of issuing motivating actions comprises said owner issuing voice commands in real-time to said animal through a speaker in electrical communication with said electronics module.

22. The method as recited in claim 14, further including the step of uploading a land tract file and causing said file to be saved in said remote database, and wherein said geo-positional coordinates obtained by said electronic module to establish a control boundary comprise the coordinates held by said land tract file.

* * * * *